(12) United States Patent
Carvajal et al.

(10) Patent No.: US 10,428,632 B2
(45) Date of Patent: Oct. 1, 2019

(54) METHOD, SYSTEM, AND OPTIMIZATION TECHNIQUE TO IMPROVE OIL RESERVOIR RECOVERY IN THE WATER-ALTERNATING-GAS INJECTION PROCESS BY USING DOWNHOLE CONTROL VALVES (WAG-CV)

(71) Applicant: Landmark Graphics Corporation, Houston, TX (US)

(72) Inventors: Gustavo Carvajal, Katy, TX (US); Michael Konopczynski, Spring, TX (US); Alejandro Chacon, Houston, TX (US); Steven Knabe, Houston, TX (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 503 days.

(21) Appl. No.: 14/893,931

(22) PCT Filed: Nov. 11, 2013

(86) PCT No.: PCT/US2013/069490
§ 371 (c)(1),
(2) Date: Nov. 24, 2015

(87) PCT Pub. No.: WO2015/030846
PCT Pub. Date: Mar. 5, 2015

(65) Prior Publication Data
US 2016/0177686 A1    Jun. 23, 2016

Related U.S. Application Data (60) Provisional application No. 61/872,477, filed on Aug. 30, 2013.

(51) Int. Cl.
*E21B 33/12* (2006.01)
*E21B 34/06* (2006.01)
(Continued)

(52) U.S. Cl.
CPC ............ *E21B 43/166* (2013.01); *E21B 33/12* (2013.01); *E21B 34/06* (2013.01); *E21B 43/12* (2013.01);
(Continued)

(58) Field of Classification Search
CPC .......... E21B 33/12; E21B 34/06; E21B 43/12; E21B 43/166; E21B 43/14
See application file for complete search history.

(56) References Cited

U.S. PATENT DOCUMENTS 4,715,444 A * 12/1987 MacAllister ............ E21B 43/20
166/269
6,325,147 B1 * 12/2001 Doerler ................. E21B 43/164
166/252.1
(Continued)

FOREIGN PATENT DOCUMENTS

| EP | 2239415 A1 | 10/2010 |
|---|---|---|
| WO | WO-03078791 A2 | 9/2003 |

OTHER PUBLICATIONS

International Search Report and Written Opinion, dated May 27, 2014, 11 pages; Korean International Searching Authority.

*Primary Examiner* — Matthew R Buck (57) ABSTRACT

A system for Water-Alternating-Gas (WAG) injection for Enhanced Oil Recovery (EOR) includes a mechanical well configured to enable multi-point selective injection for water and gas. The system further includes an optimization engine configured to calculate reservoir flow dynamics and selectively inject water and gas via the mechanical well according to reservoir flow dynamics.

20 Claims, 10 Drawing Sheets

(51) Int. Cl.
*E21B 43/12* (2006.01)
*E21B 43/14* (2006.01)
*E21B 43/16* (2006.01)
*G05B 15/02* (2006.01)
*G05D 7/06* (2006.01)

(52) U.S. Cl.
CPC .............. *E21B 43/14* (2013.01); *G05B 15/02* (2013.01); *G05D 7/0676* (2013.01)

(56) References Cited

U.S. PATENT DOCUMENTS

| | | | |
|---|---|---|---|
| 6,481,503 B2* | 11/2002 | Hamilton | E21B 43/14 166/102 |
| 7,303,006 B2* | 12/2007 | Stone | E21B 43/166 166/245 |
| 9,605,517 B2* | 3/2017 | Buechler | E21B 43/00 |
| 2008/0319726 A1* | 12/2008 | Berge | E21B 41/0064 703/10 |
| 2011/0048707 A1* | 3/2011 | Kalman | E21B 43/12 166/279 |
| 2012/0168158 A1 | 7/2012 | Nasr et al. | |
| 2015/0096756 A1* | 4/2015 | Sharma | E21B 43/24 166/306 |
| 2015/0369023 A1* | 12/2015 | MacPhail | E21B 43/12 166/269 |
| 2016/0003017 A1* | 1/2016 | Keller | E21B 43/162 166/250.1 |

* cited by examiner

METHOD, SYSTEM, AND OPTIMIZATION TECHNIQUE TO IMPROVE OIL RESERVOIR RECOVERY IN THE WATER-ALTERNATING-GAS INJECTION PROCESS BY USING DOWNHOLE CONTROL VALVES (WAG-CV)

CROSS-REFERENCE TO RELATED APPLICATIONS

This application is a U.S. National Stage patent application of International Patent Application No. PCT/US2013/069490, filed on Nov. 11, 2013, which claims priority to U.S. Provisional Patent Application No. 61/872,477, filed on Aug. 30, 2013, the benefit of both of which are claimed and the disclosure of both of which are incorporated herein by reference in their entirety.

TECHNICAL FIELD

Embodiments described herein generally relate to Water-Alternating-Gas (WAG) injection, an accepted Enhanced Oil Recovery (EOR) process.

BACKGROUND

Recovering oil from wells is sometimes difficult, when oil is trapped in a heterogeneous porous medium. In order to enhance the ability of systems to recover oil from porous mediums, various schemes of water and/or gas injection have been used to push oil from the pores in such porous media. Basic injection of gas and/or water may not be efficient in various circumstances, since the porosity of the medium, the wettability of the medium, and the viscosity of the oil contained therein may vary. Therefore, schemes that may provide for greater efficiency in such processes may be desirable.

DETAILED DESCRIPTION OF THE DRAWINGS

Described herein are embodiments of systems and methods for Enhanced WAG Using Downhole Control Valves (hereafter "WAG-CV"). The WAG-CV systems and methods described are applicable to any well configuration, whether horizontal, vertical or deviated, and to reservoirs formed by any kind of depositional environment, whether clastic or carbonate.

Water-Alternating-Gas (WAG) injection is an accepted Enhanced Oil Recovery (EOR) process commonly applied to oil reservoirs to improve oil recovery beyond conventional water or gas injection. An objective of the WAG process is to reduce residual oil saturation after conventional water or gas injection and control early water or gas breakthrough to the producers. Depending upon reservoir conditions, e.g., fluid and rock types, viscosity, and rock wettability, water may be injected in the reservoir for two to five months followed by a slug of gas, and the cycle is repeated. A variation on this technique is SWAG, or Simultaneous Water and Gas injection, where gas and water are injected at the same time using the same tubing. Water and gas may be injected using vertical wells in either WAG or SWAG.

For horizontal wells with lateral sections longer than 3,000 feet, controlling the injection point may be very difficult due to the Toe-Heel Effect, which refers to how most of the injection water may go into the first 1,000 feet or so of the well, leaving the rest of the lateral section with limited to no injection. Sometimes downhole control valves such as Inflow Control Devices (ICDs) or Interval Control Valves (ICVs) may be used to control and distribute the injection flow across the lateral section.

In embodiments of WAG-CV, continuous injection of water and gas may be used, as well as injecting water through production casing and gas through tubing while selecting the optimum injection points for water and gas individually along the lateral section of the well. This injection selectivity may be achieved by using several ICVs and a new mechanical well configuration to enable this type of continuous injection. A numerical simulation model may determine the optimum intervals in which to inject water or gas at any given time.

Embodiments of WAG-CV may have two components in some configurations:

1. An optimization technique to improve the WAG oil recovery factor by using a 3D numerical simulator that couples the well, ICVs, and reservoir flow dynamics in one computer model. This optimization technique determines how to open and close ICVs to ensure the desired selectivity of water and gas injection along the horizontal section.
2. A new mechanical well configuration to enable multi-point selective injection for the WAG-CV process.

One purpose of embodiments of WAG-CV is to generate a new WAG process that improves oil recovery significantly compared to traditional WAG injection.

Based on embodiments of WAG-CV, a series of numerical simulations injecting gas and water at different locations of the lateral section of a well were performed and it was discovered that:

A. Oil recovery factor should increase more than 5% over the traditional WAG process;
B. Water and/or gas breakthrough is delayed compared to the traditional WAG process; and
C. The residual oil saturation is significantly reduced in each region due to more homogenous oil sweep across the reservoir.

Features of embodiments of WAG-CV include the ability to:

1. Improve oil recovery beyond the traditional WAG recovery process;

2. Maximize oil sweep efficiency for each reservoir region, allowing more homogeneous oil drainage along the horizontal section of the well;
3. Delay water breakthrough in each zone, thereby extending the producing well life span; and
4. Evaluate reservoir model connectivity with streamline simulations.

Figure 1:
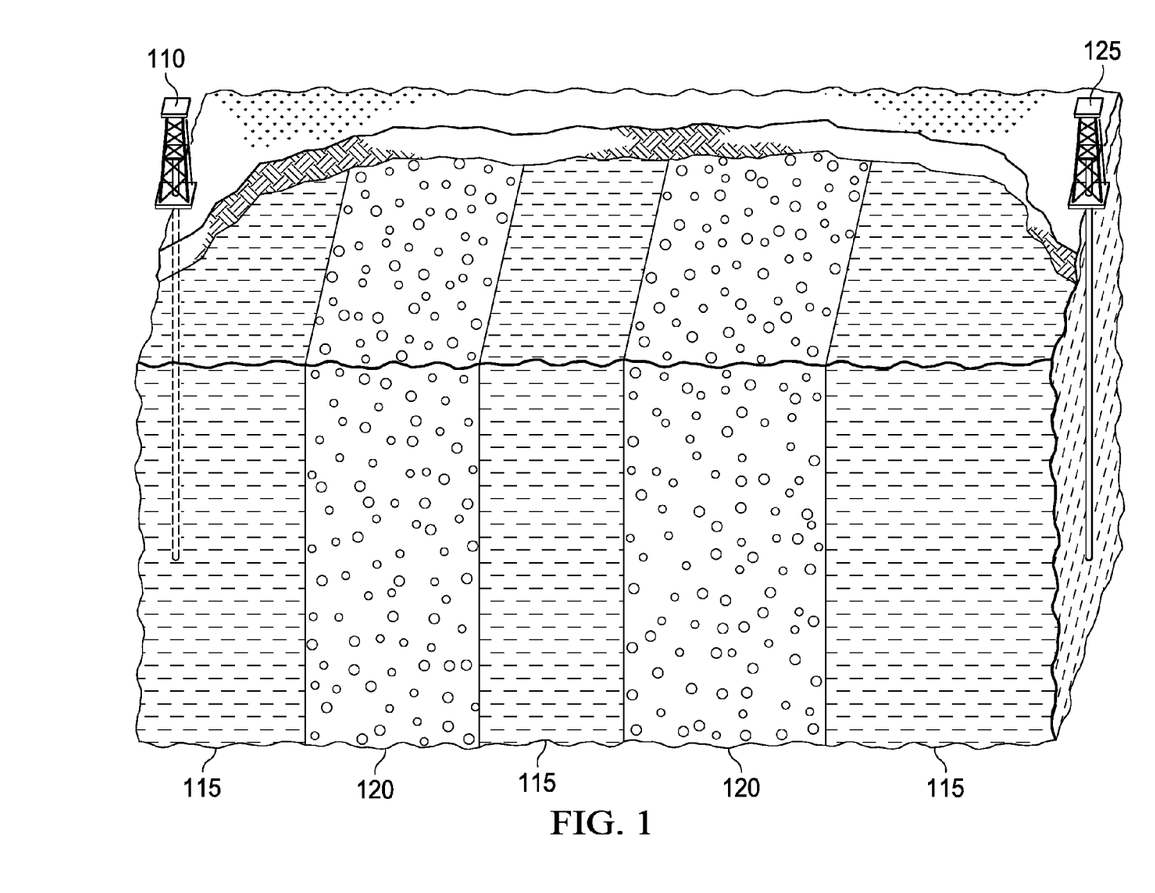
FIG. 1 shows an example of slugs of water and slugs of gas as they flow to a vertical well.

FIG. 1 describes a traditional WAG process: water is injected into the reservoir followed by a slug of gas, and the process is repeated until water cut or gas-to-oil ratio (GOR) exceeds the economic limits. Vertical well 110 is configured to inject either gas or water in a downward fashion. FIG. 1 shows slugs of water 115 and slugs of gas 120 as they flow to vertical well 125. Vertical well 125 pumps the resulting oil up from the region as it is pushed by the gas and water.

Embodiments of WAG-CV may be applied to a horizontal well that injects water continuously. The well may use two strings, where water is injected through casing and gas through tubing. The well may use a unique combination of downhole valves, sleeves, packers, and fiber optic equipment. Downhole valves and sleeves may be automatically activated on or off to coordinate the multi-injection points. The times to activate specific injection points may be defined by the optimizer software, which estimates fluid injection volumes (for gas, water, or both) and slug locations in the reservoir over time.

Figure 2:
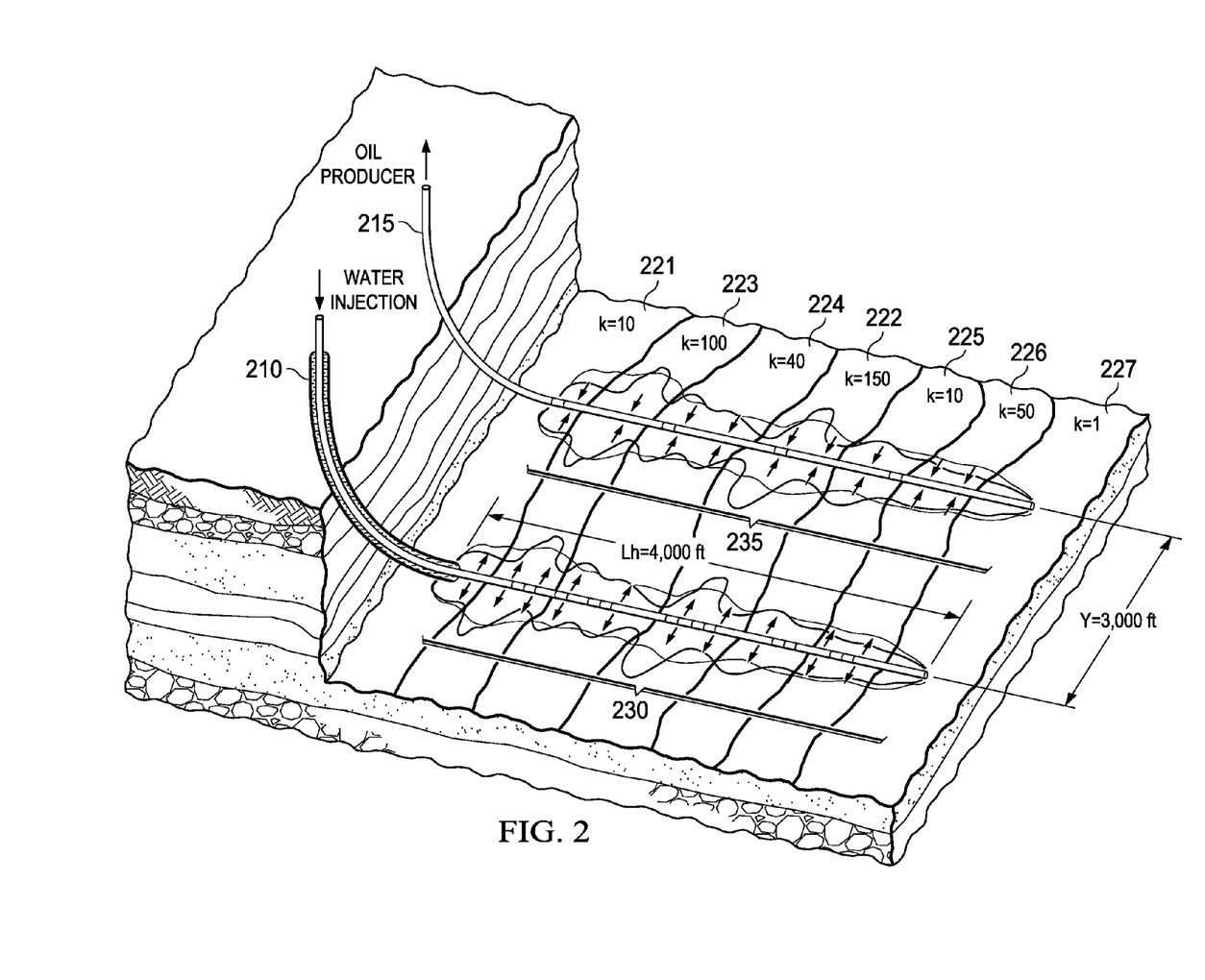
FIGS. 2-6 show one embodiment of an Enhanced WAG Using Downhole Control Valves in various stages of operation.

In one example, a reservoir may have high heterogeneity in permeability between 10 to 150 millidarcy (md) as shown in FIG. 2. The lateral section may be characterized by different reservoir regions. For instance, as shown in FIG. 2, section 221 has a permeability of 10 md and section 222 has a permeability of 150 md. Section 223 has a permeability of 100 md in the example. Section 224 has a permeability of 40 md. Section 225 has a permeability of 10 md. Section 226 has a permeability of 50 md. Section 227 has a permeability of 1 md. In order to address the differences in permeability, among other issues, when producing oil from such wells, embodiments of WAG-CV may use a 3D numerical simulator that predicts the production profiles of water, gas, and oil. In the example, an injection 210 and a producing horizontal well 215 are 3,000 feet apart and are configured in the model, each with 4,000 foot laterals 230, 235. FIG. 2 depicts the configuration of the horizontal production and injection wells.

The embodiments of the process modeled may be described as follows.

Figures 3A, 3B:
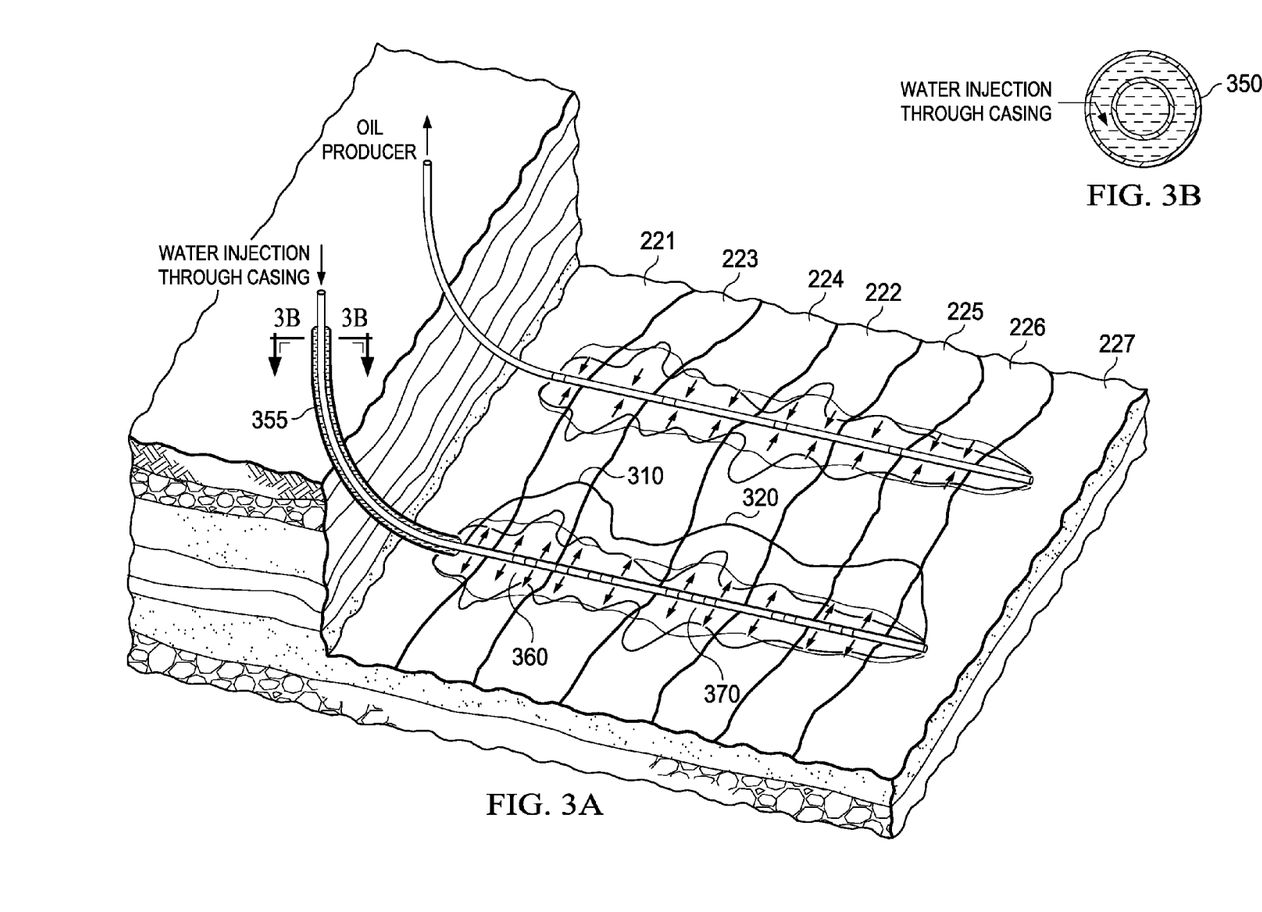

Depending upon reservoir wettability and other rock-fluid properties, water may be injected into the reservoir for a long period of time (FIG. 3A). Water may be injected through casing 350, 355. Immediately, water starts channeling into the high permeability regions such as region 360 and region 370 creating a greater amount of water 310, 320 in these regions. This is because the permeability of section 223 compared to section 221 and section 224 is much greater. All valves may be open 100% in this example. FIG. 3B shows a cross section showing water injection through the casing.

Figures 4A, 4B:
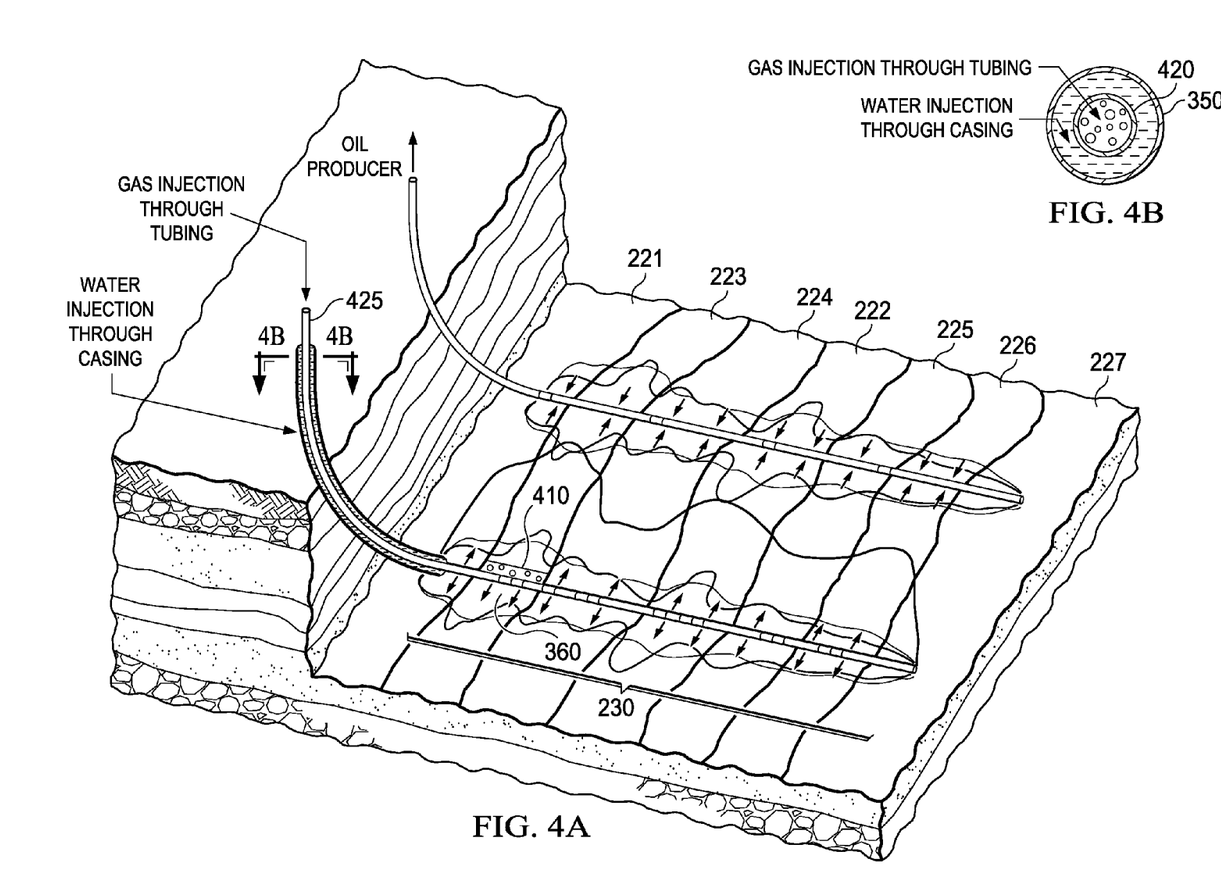

After several numerical simulation iterations, the optimizer may determine that a slug of gas should be injected through region 360 with a specified slug size and daily rate (FIG. 4A). The gas slug 410 may be injected through tubing 420, 425 to region 360, while water may be injected across the rest of the lateral section 350. The gas injection point may be defined in the second section of embodiments of WAG-CV. The sleeve in region 360 may be shut off, allowing gas injection through the tubing 425 and blocking water injection in region 360. Water may continue to be injected in the rest of the lateral section 230. FIG. 4B shows water injection through the casing and gas injection through the tubing.

Figures 5A, 5B:
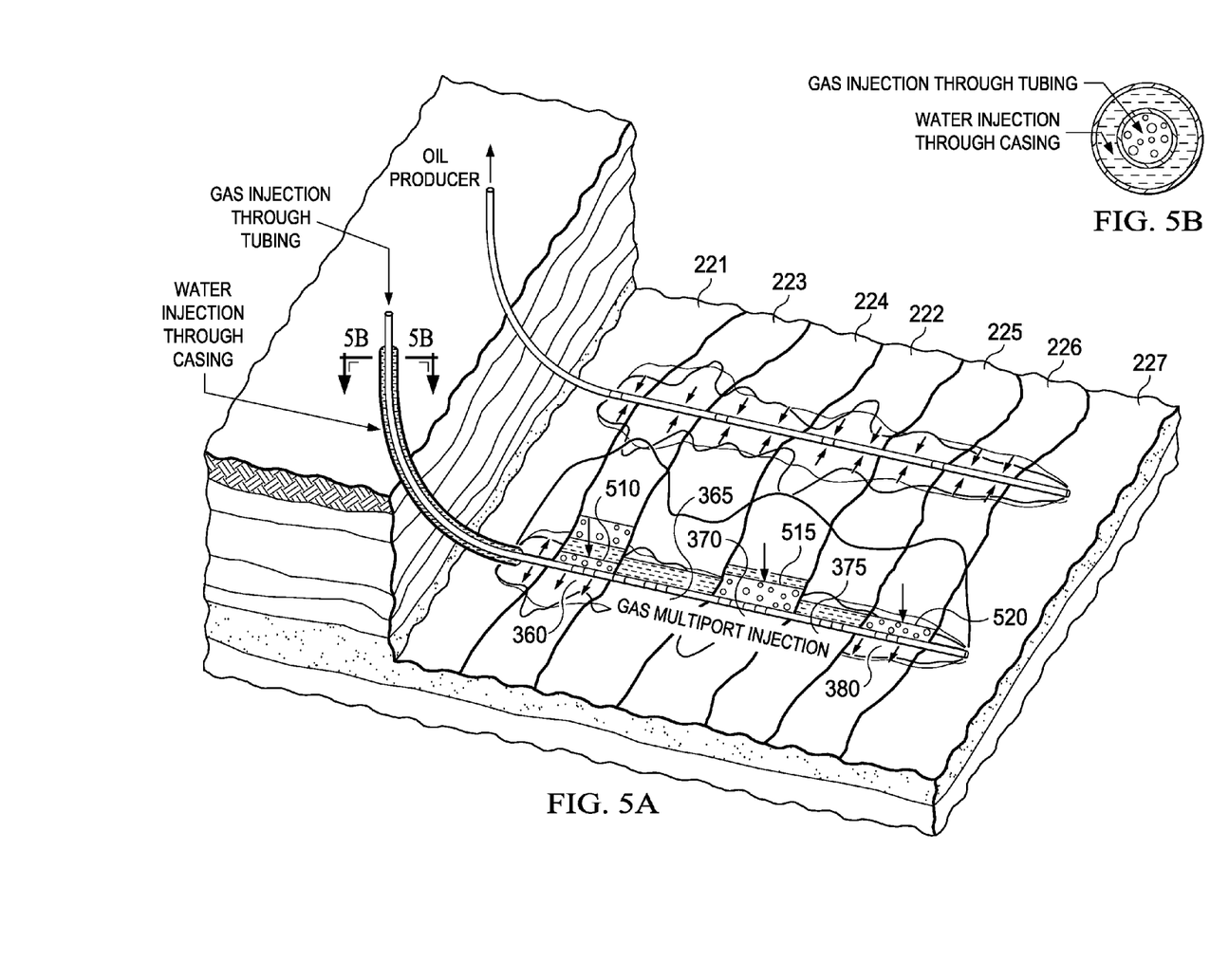

After an incremental period of time, the optimizer may determine that additional slugs 510, 515, 520 of gas should be injected through regions 360, 370, and 380 at specific volumes and injection rates as shown in FIG. 5A. The gas slugs may be injected through tubing 420, 425 in regions 360, 370, and 380, while water continues to be injected in regions 365, 375. Sleeves in regions 360, 370, and 380 may be shut off to allow gas to be injected through tubing and to block water injection in these regions. The cross section of FIG. 5B shows water injection through the casing and gas injection through the tubing.

Figures 6A, 6B:
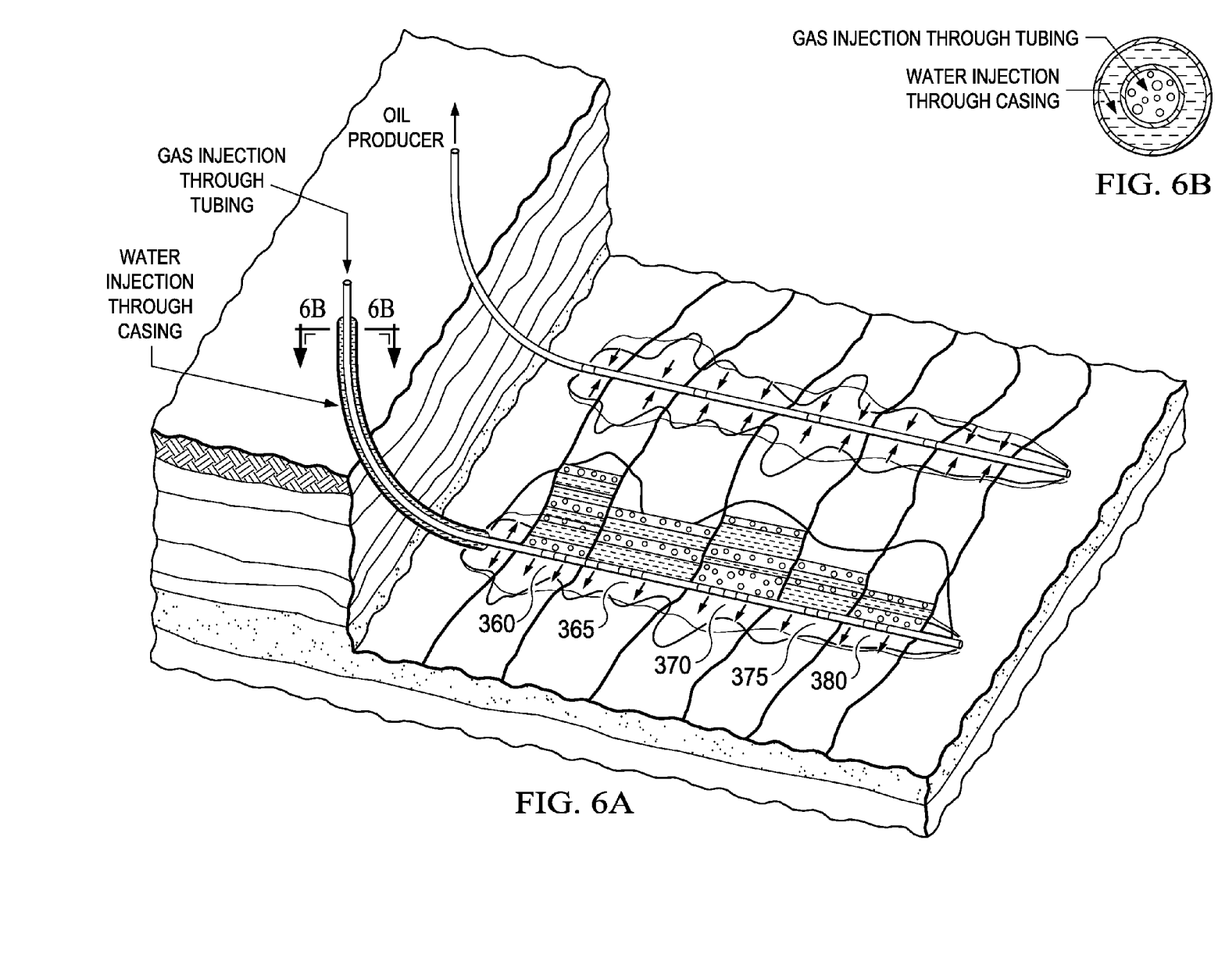

The process may be repeated in multiple cycles to maximize the oil recovery factor and minimize either water cut or gas-oil ratio (GOR). Part of the objective function is to reduce the residual oil saturation (Sor) in each region, delay early water or gas breakthrough, and achieve homogenous oil drainage across the reservoir. The process may end once GOR and/or water cut reaches the maximum production limit established by the operator. FIG. 6A shows an example of multiple slugs of gas and water having been injected. As is clear from the figure, regions 360 and 370 have been provided with a large number of slugs as compared to regions 365, 375, and 380. The cross section of FIG. 6B shows water injection through the casing and gas injection through the tubing. Note, that the above descriptions are exemplary and the exact schemes for injection will depend on the characteristics of the reservoir and the parameters set by the operator, among other factors.

Components of the Embodiments of WAG-CV

In contrast to the components that comprise the typical WAG process, embodiments of WAG-CV may include a horizontal well that injects water and gas selectively into different sections of the lateral over time to at least one producing horizontal well. Additional features of embodiments of WAG-CV include the horizontal well's mechanical configuration enabling injection of water and gas selectively into different sections of the reservoir over time. The mechanical configuration may use a series of Interval Control Valves (ICVs) (which may be Halliburton ICVs), swell packers (which may be Halliburton swell packers), and sleeves adapted to this WAG process (which may be Halliburton sleeves), thereby enabling injection of gas through multipoint injection at different lateral locations simultaneously.

A numerical reservoir simulator enables integration of the horizontal well, ICVs, and the reservoir. An example of a numerical reservoir simulator is available from Halliburton and called Nexus™. Other numerical reservoir simulators also may be used. The numerical simulator may predict the oil, water, and gas production profiles, quantify total oil recovery versus oil in situ, predict early water or gas breakthrough, and quantify sweep efficiency and oil residual saturation.

An automation tool and optimizer may be configured to automate the optimization modeling process over the life of the wells with a minimum of human intervention. The optimizer within the automated tool may calculate water and gas slug volumes, rates, and injection periods across the multiple regions of the lateral section over time. The optimizer may command the numerical simulator to update and run a number of simulations until the objective function is achieved.

Figure 7A:
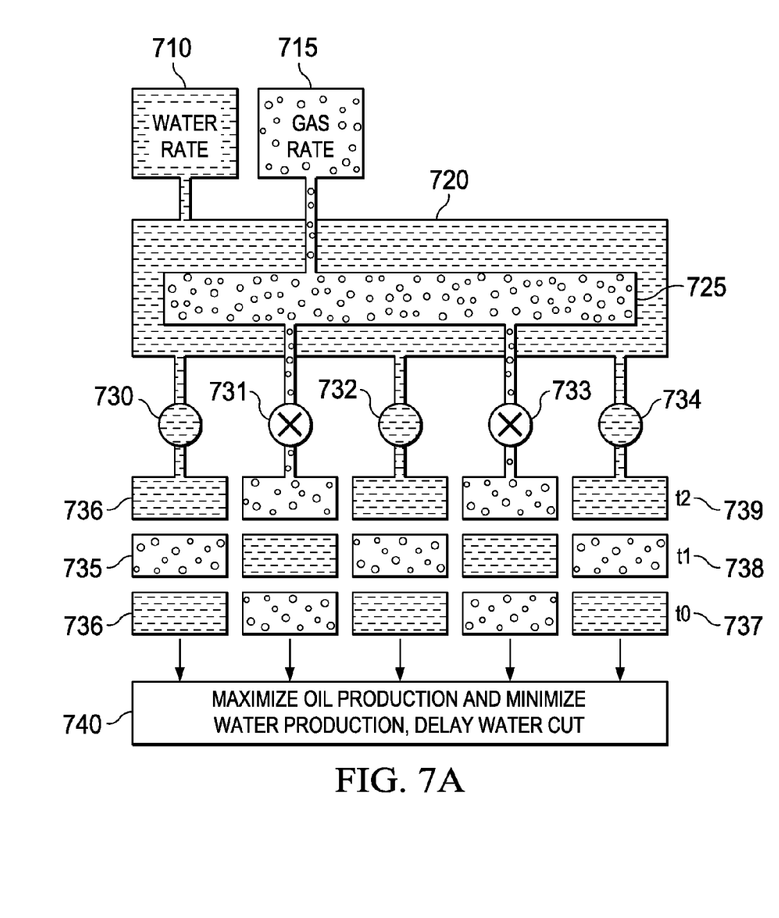
FIGS. 7a and 7b show an example of a flow chart for Enhanced WAG Using Downhole Control Valves in various stages of operation.
Figure 7B:
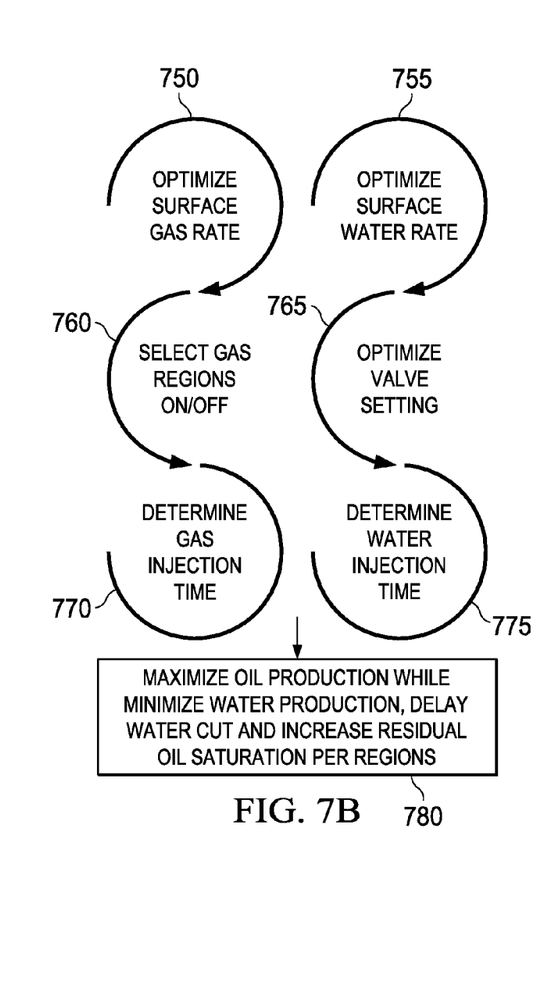

FIGS. 7a and 7b show an example of an optimization flow chart. In blocks 710 and 715, water and gas are continually injected at the wellhead. In block 720, water is injected continually at the downhole; and at block 725, gas is injected continually at the downhole. As shown, the typical arrangement will have the gas injection interior to the water injection as will be explained below. As shown, the various valves 730, 731, 732, 733, and 734 control the water rate per segment and provide for slugs of gas 735 and water 736 to be injected at various times t0 737, t1 738, t2 739. As indicated in block 740, the various injections are timed to maximize oil production and minimize water use and production as well as minimizing water cut.

FIG. 7b additionally shows a flow chart for optimizing multiple valve operations. In blocks 750 and 755, the surface gas rate and surface water rate are optimized, respectively, in relation to the desired flow in the various regions and in relation to the valves that are to be opened and closed at various times. In blocks 760 and 765, regions with the gas on or off are selected and the valve settings are optimized for water flow, respectively. In blocks 770 and 775, the gas and water injection times are determined The result as indicated in block 780 is to maximize oil production while minimizing water production, delay water cut, and increase residual oil saturation per region.

WAG-CV Well Mechanical Configuration

Figure 8:
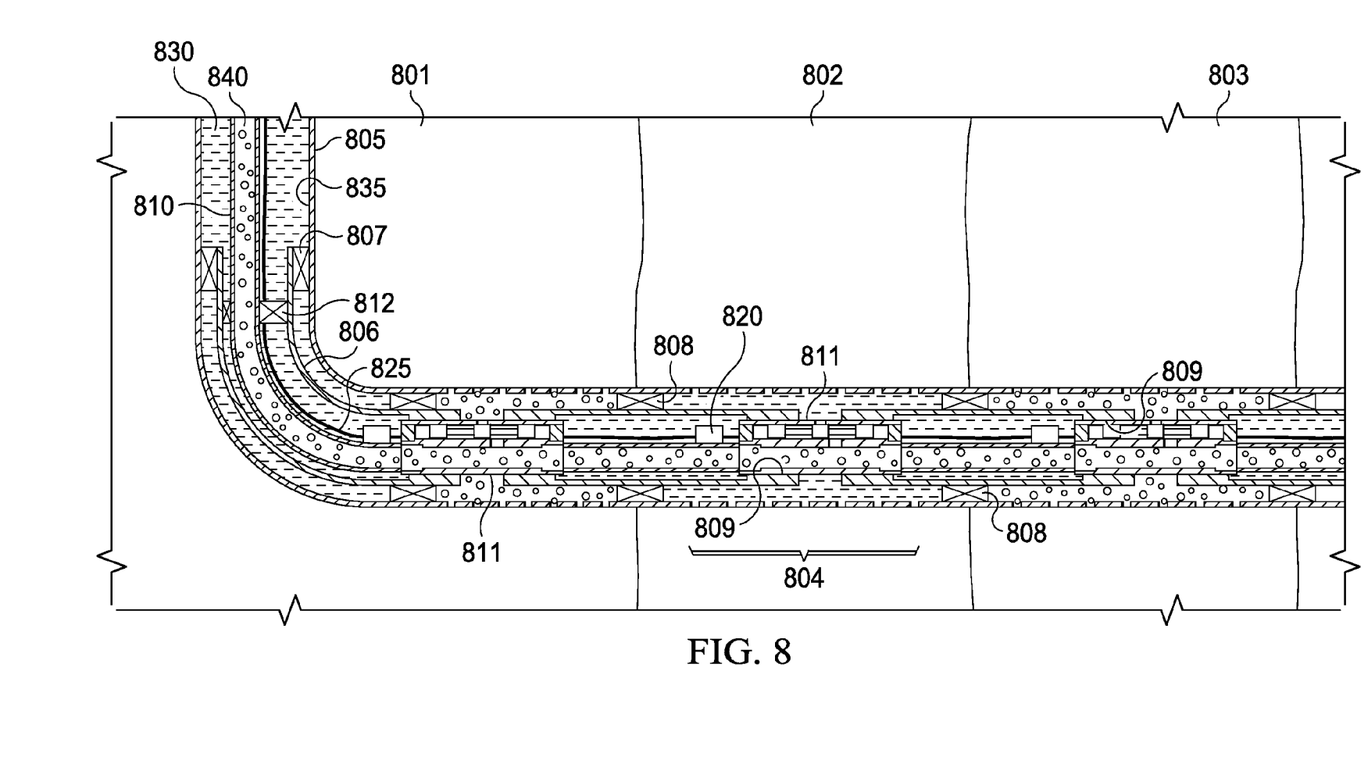
FIG. 8 shows an embodiment of the mechanical elements that may provide the water and gas injection control in a multi-zone WAG injector per an embodiment of the process described for WAG-CV.

FIG. 8 illustrates an embodiment of the mechanical elements that may provide the water and gas injection control in a multi-zone WAG injector per an embodiment of the process described for WAG-CV. The illustration is for a multi-zone horizontal well, of which three zones, 801, 802, 803, are illustrated injecting gas, water, and gas, respectively, although any combination of gas/water injection in each zone is possible. FIG. 8 provides a well completion schematic of an embodiment, while FIGS. 9-11c provide details of the three-position, three-port selector valve. The system includes perforations 804 for the delivery of gas or water from the tube.

In the example shown, the well may be drilled and completed with a horizontal leg in the target reservoir zone, and 7" production casing 805 is cemented in place. Segments of horizontal section are identified according to the reservoir geology and injection strategy, and the production casing is perforated to establish contact between the wellbore and the formation. A 5½" production liner 806 is inserted (and hangs on liner hanger 807) in the horizontal section of the 7" production casing 805, with (hydraulic set) 5½"×7" isolation packers 808 located on the 5½" liner to segment the wellbore and provide a barrier between the zones of desired injection control. Within each zone between isolation packers 808, a ported joint of 5½" liner with 4½" polished bores 809 on either side of the port is located to provide communication between the inside of the 5½" liner and the annular space in each zone between the 5½" liner and the 7" casing.

A 2⅜" injection tubing 810 is installed in the wellbore extending into the 5½" production liner 806. Along the 2⅜" injection tubing 810 are located a number of 2⅜"×5½" three-position three-port selector valves 811 (actual outer diameter is 4½" corresponding to the polished bores), which are hydraulically actuated. The number of selector valves 811 corresponds to the number of ported 5½"×4½" polished bores 809 located in the 5½" liner, and the selector valves are spaced out along the 2⅜" tubing so that they are aligned with the respective ported polished bore. The exterior of the selector valves incorporates two sets of seals which engage the polished bore 809 on either side of the port(s) to isolate each zone. The 2⅜" injection tubing is held in place by a 3½"×5½" anchor 812 located above the uppermost selector valve, and prevents relative movement between the 2⅜" tubing and 5½" liner, but allows fluid to be pumped in the annular space between the two. All above examples of the size of valves, tubing, ports, packers, linings, casings, etc., are merely exemplary, and alternative configurations for embodiments of WAG-CV are possible.

A series of ¼" control lines 825 for hydraulics, electrical conductor, and/or optical fiber are bundled and attached to the exterior of the 2⅜" injection tubing 810 with clamps, and feed through the 3½"×5½" anchor 812 and selector valves 811. The hydraulic (and electric) control lines 825 are connected to a valve control module 820 at each selector valve 811 which permits multi-plexing of the selector valves using a limited number of control lines 825. Two examples of these control modules are Halliburton's Digi-Hydraulic™ control module (all hydraulic) or Halliburton's SmartPlex™ module (electro-hydraulic hybrid control system). One of the control lines 825 containing an electric conductor may be attached to multiple electronic pressure/temperature gauges (not shown), one or more for each zone, to measure the pressure and temperature in the annular space in each zone or the water or gas injection pressure at each zone. A control line 825 with an optical fiber installed may provide distributed temperature or distributed acoustic readings which may be used to interpret the distribution of injection in each zone along the length of the well. All above examples of the size of valves, tubing, ports, packers, linings, casings, etc., are merely exemplary, and alternative configurations for embodiments of WAG-CV are possible.

Gas 840 is injected down the 2⅜" tubing 810 and is capable of passing along this conduit through each of the selector valves 811 to each zone in the horizontal well. Water 830 is injected down the 7"×2⅜" annulus 835 to the top of the 5½" liner 806, then down the 5½"×2⅜" annulus through the 3½"×5½" anchor 812, and is capable of passing through each selector valve 811 through bypass ports to each zone in the horizontal well.

Figure 9:
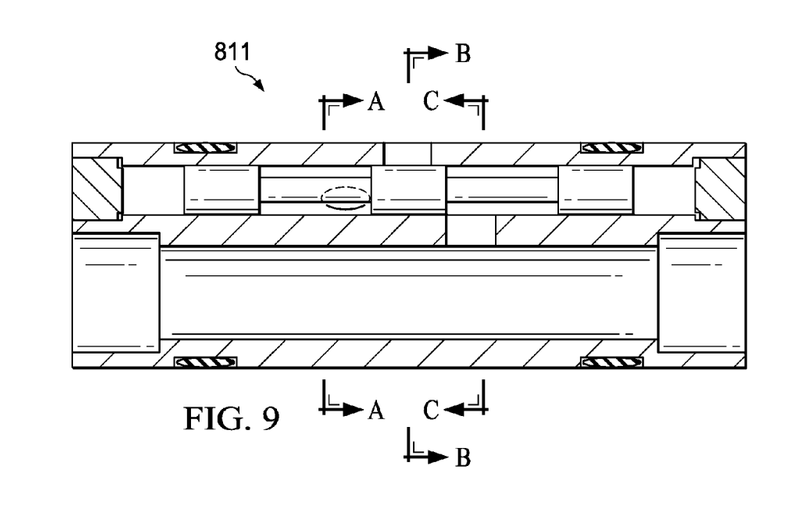
FIG. 9 shows an embodiment of an area of selector valve with cross-sections A, B, and C.
Figure 10:
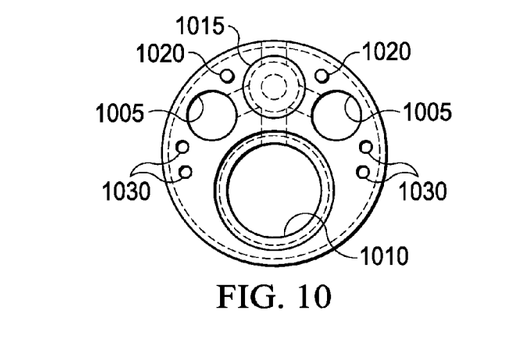
FIG. 10 shows an embodiment of a combined cross-section view of the selector valve.

The selector valve is a three-position valve, allowing communication between the interior of the 2⅜" injection tubing 810 and the port to the 5½"×7" annulus for gas injection, communication between the 2⅜"×5½" annulus and the port to the 5½"×7" annulus for water injection, or isolation of the zone from either gas or water injection. FIGS. 9 and 10 provide greater detail of the selector valve operation in one embodiment of WAG-CV. All above examples of the size of valves, tubing, ports, packers, linings, casings, etc., are merely exemplary, and alternative configurations for embodiments of WAG-CV are possible.

Figure 11A:
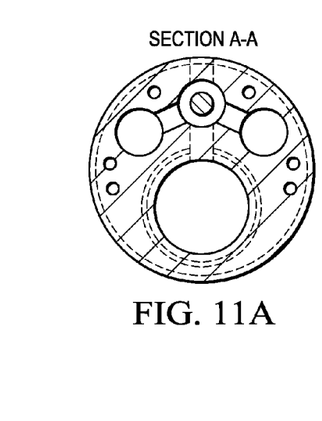
FIG. 11a shows cross-section A of FIG. 9.
Figure 11B:
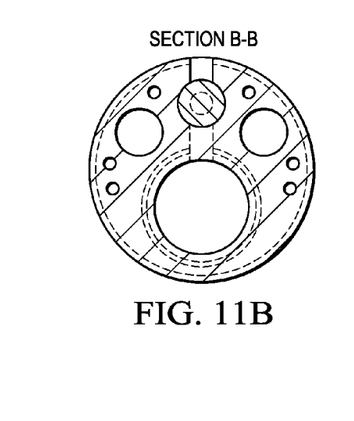
FIG. 11b shows cross-section B of FIG. 9.
Figure 11C:
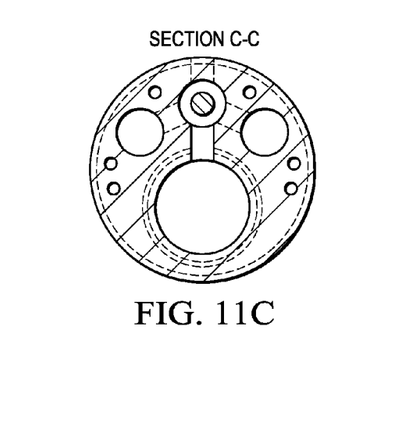
FIG. 11c shows cross-section C of FIG. 9.

FIG. 9 shows the area of selector valve 811 with cross-sections A, B, and C. FIG. 11a shows cross-section A; FIG. 11b shows cross-section B; and FIG. 11c shows cross-section C. The selector valve 811 is threaded onto the 2⅜" injection tubing 810, and provides a gas bypass port 1010 axially through the valve 811. FIG. 10 shows a combined cross-section view of the selector valve 811. Two other smaller bypass ports 1005 for water provide communication through the valve 811 in the axial direction from one end of the valve to the other to connect the annular space on either side of the valve. A three-position spool valve 1015 is located axially in the selector valve 811 and is actuated by injecting hydraulic fluid on either end of the spool valve 1020 (double acting). A détente mechanism may be incorporated in the spool (not shown) to help maintain the spool valve in the middle position (no injection—isolating the zone). This is the position of the spool shown in FIG. 10.

When the spool valve moves to the left in the illustration, communication is established between the interior of the 2⅜" tubing 810 and the port leading to the 5½"×7" annulus for gas injection in the respective zone (Section C-C of FIG. 9). When the spool valve 811 moves to the right, communication is established between the two water bypass ports 1005 and the port leading to the 5½"×7" annulus for water injection in the respective zone (Section A-A of FIG. 9). The spool moves by injecting hydraulic fluid in the chamber at one end of the spool and withdrawing hydraulic fluid from the hydraulic chamber at the opposite end. This is done through two small ports drilled in the valve body (not shown) connecting the hydraulic control line 1030 connection ports to the respective hydraulic chambers.

End plugs on the spool valve allow for assembly and adjusting the limits of movement of the spool. Note that this spool valve is not hydraulically balanced between the water and gas injection pressures—a difference in pressure may cause the spool to move from its intended position. The valve control module for this design must be capable of isolating the hydraulic chambers at either end of the spool to prevent ingress or expression of hydraulic actuation fluid and subsequent movement of the spool. A different design of the spool valve may be possible to balance the valve and prevent this problem.

At least four control line feed 1030 through ports are drilled axially through the valve to allow installation of the hydraulic, electric, and/or optical fiber control lines necessary for communication, power, and control of all valves. The hydraulic (and electric) lines are connected upstream of each valve to the valve control modules to provide power and communication to the control modules. Two ¼" hydraulic control line ports also are located on one end of the valve and are connected to the valve control modules to provide the hydraulic actuation force to the spool valve via the hydraulic chambers at each end of the spool valve.

Seal assemblies are located on the exterior of the selector valve to engage the ported seal bore 809 on the 5½" liner. The illustrations shown are not to scale, and it is likely that the length of the selector valve may be greatly increased to increase the length of the seal assemblies to reduce the sensitivity to the space out of the completion.

As may be expected, there are many variations that can be envisaged to the mechanical design of embodiments WAG-CV. The selector valve may be actuated hydraulically or electro-mechanically (motor, gears). Water may be injected down the interior (2⅜") tubing and gas down the annular space. Different combinations of tubing size, liner size, and casing size may be employed. The production liner may be extended all the way to the wellhead to isolate the production casing from the injection fluids. The reservoir section of the wellbore may be open hole (requiring mechanical, inflatable, or swell isolation packers), a slotted liner, or a screen, and also may include gravel packing or frac-packing for sand control.

Instead of the tubular conduits being concentric, water and gas may be injected down separate, parallel injection tubing strings within the production casing, although this would require separate control valves on each string at each zone, and dual completion isolation packers for each zone. This variation would greatly complicate the design and installation of the completion over the concentric design described.

A port may be included in the selector valve to enable connection of a pressure gauge to the annular port of the selector valve, thereby allowing measurement of the pressure in each zone.

Specific flow restrictors may be included in the cross-communication ports in the selector valves to limit the rate of injection in each zone.

The seal assemblies may be separate from the selector valve to optimize the economics of the design, modularize the valve/seal design, and provide greater flexibility for space-out.

Figure 12:
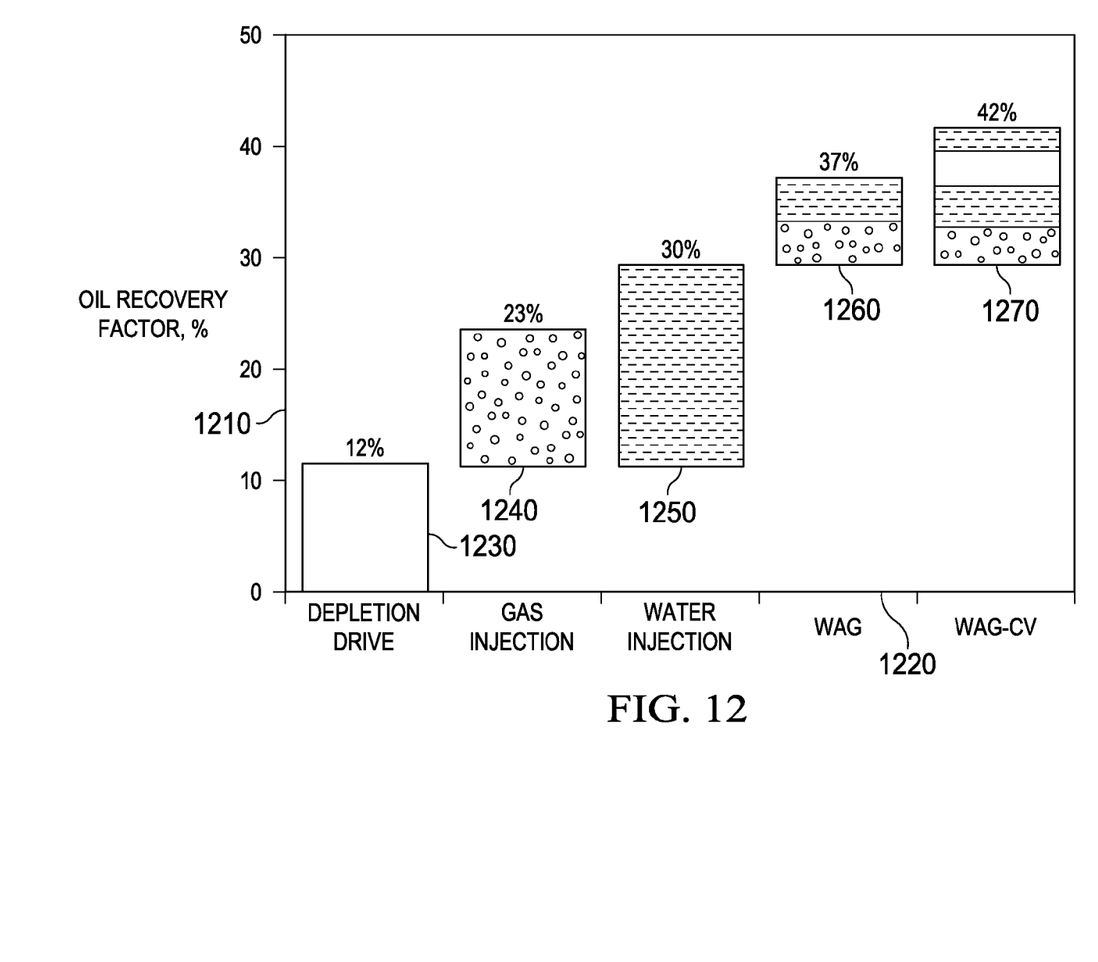
FIG. 12 shows an example of the estimated efficiency improvements achieved by the WAG-CV.

Depending upon reservoir parameters, wettability preferences of the rock, and fluid-rock interaction, some reservoirs respond more favorably to water injection and others to gas injection. The example in this document is of a reservoir with water-wet properties, meaning water flooding will sweep the oil much better than gas injection. FIG. 12 shows an example of the estimated efficiency improvements achieved by the WAG-CV. The y-axis 1210 represents the oil recovery percentage. The x-axis 1220 represents the type of recovery system used. The simulated reservoir with the horizontal well configuration shown in FIG. 2 can achieve an oil recovery factor of 12% through natural depletion drive 1230. The simulation indicates that gas injection 1240 increases the recovery factor to 23% (11% more than depletion drive). Injecting water 1250, the reservoir can produce up to 30% (7% more than gas and 18% more than depletion drive). Simulating a case using traditional WAG 1260 (water-alternating-gas with several cycles of water and gas slugs) increases the oil recovery factor from 30% to 37% (7% more than water injection). The WAG process using selective multi-point injection along the horizontal section according to embodiments of WAG-CV produced even better results. The results for WAG-CV 1270 show that the oil recovery factor should increase from 30% to 42%, 12% more than conventional water injection and 5% more than the traditional WAG process.

Embodiments of WAG-CV may differ from the traditional WAG process in the following ways:
1. Integration of a complex numerical simulator with an optimizer to optimize the volume, rate, injection periods and locations of water and gas slugs over time; and
2. Addition of new completion components such as ICVs, sleeves, and swell packers in a unique configuration to allow multi-point injection.

Embodiments of WAG-CV may offer:
A. Increased oil recovery by more than 5% over the traditional WAG process;
B. Delayed early water and/or gas breakthrough to improve oil recovery and reduce the cost of water treatment and gas processing;
C. Reduced by-passed oil and residual oil saturation in the whole reservoir; and
D. Reduced cost associated with drilling another injection well.

In one embodiment, a system for Water-Alternating-Gas (WAG) injection for Enhanced Oil Recovery (EOR) includes a mechanical well configured to enable multi-point selective injection for water and gas. The system further includes an optimization engine configured to calculate reservoir flow dynamics and selectively inject water and gas via the mechanical well according to reservoir flow dynamics. Optionally, the calculation performed by the optimization engine includes a determination of an optimization technique, the optimization technique including use of a 3D numerical simulator that couples the well, Interval Control Valves (ICVs), and reservoir flow dynamics in a computer model. In one alternative, the optimization technique determines when to open and close ICVs to ensure a desired selectivity of water and gas injection along a horizontal section of the mechanical well and thereby perform the selective injection of water and gas. In another alternative, the mechanical well includes a first system for delivery of water and a second system for the delivery of gas. Optionally, a horizontal section of the mechanical well includes perforations for the delivery of water and gas. In one configuration, the horizontal section is divided into subsections by isolation packers, such that a first subsection of the subsections delivers water while a second subsection of the subsections delivers gas, the first subsection being adjacent to the second subjection. Optionally, the first system for delivery of water includes a casing that receives water, the casing surrounding a tube that receives gas, the tube included as part of the second system for the delivery of gas. Alternatively, the mechanical well includes a port selection valve for each of the subsections, the port selection valve configured to provide for the injection of water or gas in each of the subsections.

In one embodiment, a method of Enhanced Oil Recovery (EOR) using Water-Alternating-Gas (WAG) injection includes providing a mechanical well configured to enable multi-point selective injection for water and gas. The method further includes calculating reservoir flow dynamics using an optimization engine. The method further includes selectively injecting water and gas via the mechanical well according to reservoir flow dynamics. Optionally, the calculating performed by the optimization engine includes determining an optimization technique, the optimization technique including use of a 3D numerical simulator that couples the well, Interval Control Valves (ICVs) and reservoir flow dynamics in a computer model. Alternatively, the optimization technique provides how to open and close ICVs to ensure a desired selectivity of water and gas injection along a horizontal section of the mechanical well and thereby perform the selective injecting. In one configuration, the mechanical well includes a first system for delivery of water and a second system for the delivery of gas; a horizontal section of the mechanical well includes perforations for the delivery of water and gas; and isolation packers, the horizontal section is divided into subsections by isolation packers, such that a first subsection of the subsections delivers water while a second subsection of the subsections delivers gas, the first subsection being adjacent to the second subjection. In another configuration, the first system for delivery of water includes a casing that receives water, the casing surrounding a tube that receives gas, the tube included as part of the second system for the delivery of gas.

In one embodiment, a mechanical well for use in multi-point selective injection for water and gas includes a first system for delivery of water and a second system for the delivery of gas. The mechanical well further includes a horizontal section of the mechanical well which includes perforations for the delivery of water and gas. The mechanical well further includes isolation packers; the horizontal section is divided into subsections by isolation packers, such that a first subsection of the subsections delivers water while a second subsection of the subsections delivers gas, the first subsection being adjacent to the second subjection. Optionally, the first system for delivery of water includes a casing that receives water, the casing surrounding a tube that receives gas, the tube included as part of the second system for the delivery of gas. Alternatively, comprising a port selection valve for each of the subsections, the port selection valve is configured to provide for the injection of water or gas in each of the subsections. In one configuration, the port selection valve includes a gas bypass port and a first and second water bypass port. Optionally, the port selection valve includes a spool valve, the spool valve positioned and configured to turn flow off and on for the gas bypass port and the first and second water bypass port. Alternatively, the spool valve has a first, second, and third orientation, the first orientation characterized by providing flow of water out of perforations of a subsection of the subsections associated with the port selection valve; the second orientation characterized by providing flow of gas out of perforations of the subsection of the subsections associated with the port selection valve; and the third orientation characterized by providing no flow out of perforations of the subsection of the subsections associated with the port selection valve.

The previous detailed description is of a small number of embodiments for implementing the systems and methods for WAG-CV and is not intended to be limiting in scope. The following claims set forth a number of the embodiments of the systems and methods for WAG-CV disclosed with greater particularity.

What is claimed:

1. A system for Water-Alternating-Gas (WAG) injection for Enhanced Oil Recovery (EOR) comprising:
a mechanical well to enable multi-point selective injection for water and gas via a plurality of injection points along the mechanical well, wherein the mechanical well includes a first system for delivery of water and a second system for delivery of gas, a horizontal section of the mechanical well includes perforations for the delivery of water and gas, and the horizontal section is divided into subsections corresponding to the plurality of injection points by isolation packers such that a first subsection of the subsections delivers water while a second subsection of the subsections adjacent to the first subsection delivers gas; and
an optimization engine to calculate reservoir flow dynamics and selectively inject at least one of water or gas via each of the plurality of injection points along the mechanical well according to the calculated reservoir flow dynamics.

2. The system of claim 1, wherein the calculation performed by the optimization engine includes a determination of an optimization technique, the optimization technique including use of a 3D numerical simulator that couples the well, Interval Control Valves (ICVs), and reservoir flow dynamics in a computer model.

3. The system of claim 2, wherein the optimization technique determines when to open and close each of the ICVs to ensure a desired selectivity of water and gas injection via the plurality of injection points along the horizontal section of the mechanical well and thereby perform the multi-point selective injection of water and gas.

4. The system of claim 1, wherein the first system for the delivery of water includes a casing that receives water, the casing surrounds a tube that receives gas, and the tube is included as part of the second system for the delivery of gas.

5. The system of claim 4, wherein the mechanical well includes a port selection valve for each of the subsections, the port selection valve configured to provide for the injection of water or gas in each of the subsections.

6. The system of claim 5, wherein the port selection valve includes a gas bypass port, a first water bypass port, and a second water bypass port.

7. The system of claim 6, wherein the port selection valve includes a spool valve, and the spool valve is used to turn flow off and on for the gas bypass port and each of the first and second water bypass ports.

8. The system of claim 7, wherein the port selection valve and the spool valve for each of the subsections along the horizontal section of the mechanical well are automatically controlled according to the reservoir flow dynamics calculated by the optimization engine.

9. The system of claim 7, wherein the spool valve has a first, second, and third orientation, the first orientation characterized by providing flow of water out of perforations of a subsection of the subsections associated with the port selection valve; the second orientation characterized by providing flow of gas out of perforations of the subsection of the subsections associated with the port selection valve; and the third orientation characterized by providing no flow out of perforations of the subsection of the subsections associated with the port selection valve.

10. A method of Enhanced Oil Recovery (EOR) using Water-Alternating-Gas (WAG) injection, the method comprising:
    providing a mechanical well to enable multi-point selective injection for water and gas via a plurality of injection points along the mechanical well, wherein the mechanical well includes a first system for delivery of water and a second system for delivery of gas, a horizontal section of the mechanical well includes perforations for the delivery of water and gas, and the horizontal section is divided into subsections corresponding to the plurality of injection points by isolation packers such that a first subsection of the subsections delivers water while a second subsection of the subsections adjacent to the first subsection delivers gas;
    calculating reservoir flow dynamics using an optimization engine; and
    selectively injecting at least one of water or gas via each of the plurality of injection points along the mechanical well according to the calculated reservoir flow dynamics.

11. The method of claim 10, wherein the calculating performed by the optimization engine includes determining an optimization technique, the optimization technique including use of a 3D numerical simulator that couples the well, Interval Control Valves (ICVs), and reservoir flow dynamics in a computer model.

12. The method of claim 11, wherein the optimization technique provides how to open and close each of the ICVs to ensure a desired selectivity of water and gas injection via the plurality of injection points along the horizontal section of the mechanical well and thereby perform the selective injecting.

13. The method of claim 10, wherein the first system for the delivery of water includes a casing that receives water, the casing surrounds a tube that receives gas, and the tube is included as part of the second system for the delivery of gas.

14. The method of claim 13, wherein a port selection valve is included for each of the subsections, the port selection valve configured to provide for the injection of water or gas in each of the subsections.

15. A mechanical well for use in multi-point selective injection for water and gas, comprising:
    a first system for delivery of water and a second system for delivery of gas, the first system including a casing for receiving water, and the second system including a tube surrounded by the casing for receiving gas;
    a horizontal section of the mechanical well includes perforations for the delivery of water and gas;
    isolation packers, the horizontal section is divided into subsections corresponding to the perforations by the isolation packers, such that a first subsection of the subsections delivers water while a second subsection of the subsections delivers gas, the first subsection being adjacent to the second subsection; and
    a port selection valve to selectively inject at least one of water or gas via the corresponding perforations in each of the subsections along the horizontal section of the mechanical well.

16. The mechanical well of claim 15, wherein the port selection valve is automatically controlled to provide for the selective injection of water or gas in each of the subsections according to reservoir flow dynamics calculated by an optimization engine coupled to the mechanical well.

17. The mechanical well of claim 16, wherein the port selection valve includes a gas bypass port, a first water bypass port, and a second water bypass port.

18. The mechanical well of claim 17, wherein the port selection valve includes a spool valve, the spool valve positioned and configured to turn flow off and on for the gas bypass port and each of the first and second water bypass ports.

19. The mechanical well of claim 18, wherein the spool valve has a first, second, and third orientation, the first orientation characterized by providing flow of water out of perforations of a subsection of the subsections associated with the port selection valve; the second orientation characterized by providing flow of gas out of perforations of the subsection of the subsections associated with the port selection valve; and the third orientation characterized by providing no flow out of perforations of the subsection of the subsections associated with the port selection valve.

20. The mechanical well of claim 18, wherein the port selection valve and the spool valve for each of the subsections along the horizontal section of the mechanical well are automatically controlled according to the reservoir flow dynamics calculated by the optimization engine coupled to the mechanical well.

* * * * *